(12) United States Patent
Lindeman et al.

(10) Patent No.: US 10,419,377 B2
(45) Date of Patent: Sep. 17, 2019

(54) METHOD AND SYSTEM FOR CATEGORIZING INSTANT MESSAGES

(71) Applicant: Apple Inc., Cupertino, CA (US)

(72) Inventors: Kevin J. Lindeman, Morgan Hill, CA (US); Keith W. Rauenbuehler, San Francisco, CA (US); Stuart T. Montgomery, Sunnyvale, CA (US); Andrew Wadycki, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 268 days.

(21) Appl. No.: 15/610,564

(22) Filed: May 31, 2017

(65) Prior Publication Data

US 2018/0351898 A1    Dec. 6, 2018

(51) Int. Cl.
*H04L 12/58* (2006.01)
*G06F 21/53* (2013.01)

(52) U.S. Cl.
CPC .............. *H04L 51/12* (2013.01); *G06F 21/53* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 6,421,709 B1 * | 7/2002 | McCormick | ......... | G06Q 10/107 709/206 |
| 7,577,993 B2 * | 8/2009 | Roychowdhary | ....... | H04L 51/04 726/22 |
| 7,636,716 B1 * | 12/2009 | Cheng | .................. | G06Q 10/107 |
| 7,747,785 B2 * | 6/2010 | Baker, III | ............ | G06Q 10/107 709/206 |
| 7,756,929 B1 * | 7/2010 | Pettigrew | ................ | H04L 51/12 709/206 |
| 7,809,795 B1 * | 10/2010 | Cooley | ................ | G06Q 10/107 709/200 |
| 7,870,216 B2 | 1/2011 | Patron et al. | | |
| 8,255,572 B1 * | 8/2012 | Coomer | ............... | G06Q 10/107 709/206 |

(Continued)

OTHER PUBLICATIONS

"ContentFilter Plugin Readme," <https://www.igniterealtime.org/projects/openfire/plugins/contentfilter/readme.html>, Accessed May 22, 2017, 1 page.

*Primary Examiner* — Backhean Tiv
(74) *Attorney, Agent, or Firm* — Morgan, Lewis & Bockius LLP

(57) ABSTRACT

According to one embodiment, in response to a request received from a messaging system to categorize a message received from a remote sender, a messaging extension associated with the messaging client is identified. The message without a recipient identifier (ID) identifying a recipient of the message is transmitted to the messaging extension via a first application programming interface (API). The messaging extension is executed within a first sandboxed environment and the messaging extension is to perform a content analysis on the message to categorize the message. In response to a first analysis result received from the messaging extension, a response representing the first analysis result is transmitted to the messaging system, wherein the response indicates whether the message should be delivered or filtered.

25 Claims, 8 Drawing Sheets

(56) References Cited

U.S. PATENT DOCUMENTS

| | | | |
|---|---|---|---|
| 8,290,948 B2 | 10/2012 | Shuster et al. | |
| 8,880,611 B1* | 11/2014 | Lim | H04L 51/12 709/204 |
| 9,106,694 B2* | 8/2015 | Aziz | G06F 21/56 |
| 9,647,975 B1* | 5/2017 | Dedenok | H04L 51/12 |
| 9,774,626 B1* | 9/2017 | Himler | H04L 63/1483 |
| 9,853,935 B2* | 12/2017 | Clark | H04L 51/32 |
| 9,876,753 B1* | 1/2018 | Hawthorn | H04L 51/34 |
| 9,912,687 B1* | 3/2018 | Wescoe | H04L 63/1433 |
| 10,050,998 B1* | 8/2018 | Singh | H04L 63/1416 |
| 10,078,750 B1* | 9/2018 | Oliver | G06F 21/552 |
| 10,243,904 B1* | 3/2019 | Wescoe | H04L 51/12 |
| 10,270,789 B2* | 4/2019 | Singh | H04L 63/1416 |
| 2004/0006706 A1* | 1/2004 | Erlingsson | G06F 21/51 726/30 |
| 2004/0154022 A1* | 8/2004 | Boss | G06Q 10/107 719/310 |
| 2004/0221062 A1* | 11/2004 | Starbuck | G06Q 10/107 709/246 |
| 2005/0080860 A1* | 4/2005 | Daniell | G06Q 10/107 709/206 |
| 2005/0188023 A1* | 8/2005 | Doan | G06Q 10/107 709/206 |
| 2005/0223239 A1* | 10/2005 | Dotan | G06F 21/52 713/188 |
| 2006/0053203 A1* | 3/2006 | Mijatovic | H04L 51/12 709/206 |
| 2006/0079255 A1* | 4/2006 | Bantukul | H04L 51/12 455/466 |
| 2007/0006026 A1* | 1/2007 | Roychowdhary | H04L 51/04 714/12 |
| 2007/0118759 A1* | 5/2007 | Sheppard | G06F 21/552 713/188 |
| 2007/0294352 A1* | 12/2007 | Shraim | G06Q 10/107 709/206 |
| 2007/0294763 A1* | 12/2007 | Udezue | G06F 21/51 726/22 |
| 2008/0028031 A1* | 1/2008 | Bailey | G06Q 10/10 709/207 |
| 2008/0127339 A1* | 5/2008 | Swain | H04L 51/12 726/22 |
| 2008/0140781 A1* | 6/2008 | Bocharov | G06Q 10/107 709/206 |
| 2009/0064329 A1* | 3/2009 | Okumura | H04L 51/12 726/22 |
| 2009/0187634 A1* | 7/2009 | Colon | H04L 51/04 709/206 |
| 2009/0307313 A1* | 12/2009 | Wang | G06Q 10/107 709/206 |
| 2010/0036786 A1* | 2/2010 | Pujara | G06Q 10/107 706/46 |
| 2010/0145900 A1* | 6/2010 | Zheng | G06N 7/005 706/52 |
| 2010/0185733 A1* | 7/2010 | Hon | G06Q 10/10 709/205 |
| 2014/0161237 A1* | 6/2014 | Tolksdorf | H04M 3/493 379/68 |
| 2014/0181974 A1* | 6/2014 | Yablokov | G06F 21/566 726/23 |
| 2014/0215617 A1* | 7/2014 | Smith | H04L 63/1441 726/23 |
| 2015/0172243 A1* | 6/2015 | Parikh | H04L 51/12 709/206 |
| 2015/0213259 A1* | 7/2015 | Du | H04L 63/1466 726/27 |
| 2015/0237068 A1* | 8/2015 | Sandke | H04L 63/1466 726/23 |
| 2015/0381653 A1* | 12/2015 | Starink | G06F 16/22 726/22 |
| 2016/0147731 A1* | 5/2016 | Parikh | G06F 17/276 715/261 |
| 2016/0149943 A1* | 5/2016 | Kaloroumakis | G06N 7/005 726/23 |
| 2017/0034185 A1* | 2/2017 | Green | H04L 63/123 |
| 2017/0078321 A1* | 3/2017 | Maylor | H04L 63/1433 |
| 2017/0109528 A1* | 4/2017 | Harris | H04L 63/145 |
| 2017/0177318 A1* | 6/2017 | Mark | G06F 16/248 |
| 2017/0244736 A1* | 8/2017 | Benishti | H04L 63/1441 |
| 2017/0272544 A1* | 9/2017 | Sheppard | A63F 13/35 |
| 2017/0300472 A1* | 10/2017 | Parikh | G06F 17/2705 |
| 2017/0359285 A1* | 12/2017 | Weinig | H04L 51/066 |
| 2018/0152471 A1* | 5/2018 | Jakobsson | G06Q 50/01 |
| 2018/0351898 A1* | 12/2018 | Lindeman | H04L 51/046 |
| 2018/0375877 A1* | 12/2018 | Jakobsson | G06F 21/554 |

\* cited by examiner

METHOD AND SYSTEM FOR CATEGORIZING INSTANT MESSAGES

FIELD OF THE DISCLOSURE

Embodiments of the present disclosure relate generally to instant messaging systems. More particularly, embodiments of the disclosure relate to categorizing instant messages.

BACKGROUND

Instant messaging (IM) is a set of communication technologies used for text-based communication between two or more participants over the Internet or other types of networks. IM-chat happens in real-time. Of importance is that online chat and instant messaging differ from other technologies such as email due to the perceived quasi-synchrony of the communications by the users. IM allows effective and efficient communication, allowing immediate receipt of acknowledgment or reply.

As IM is getting more popular, more often users have become targets of unsolicited spam and more unwanted messages may be received from unknown or unwanted sources. There has been a lack of sufficient spam filtering techniques available to counter the unwanted instant messages.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
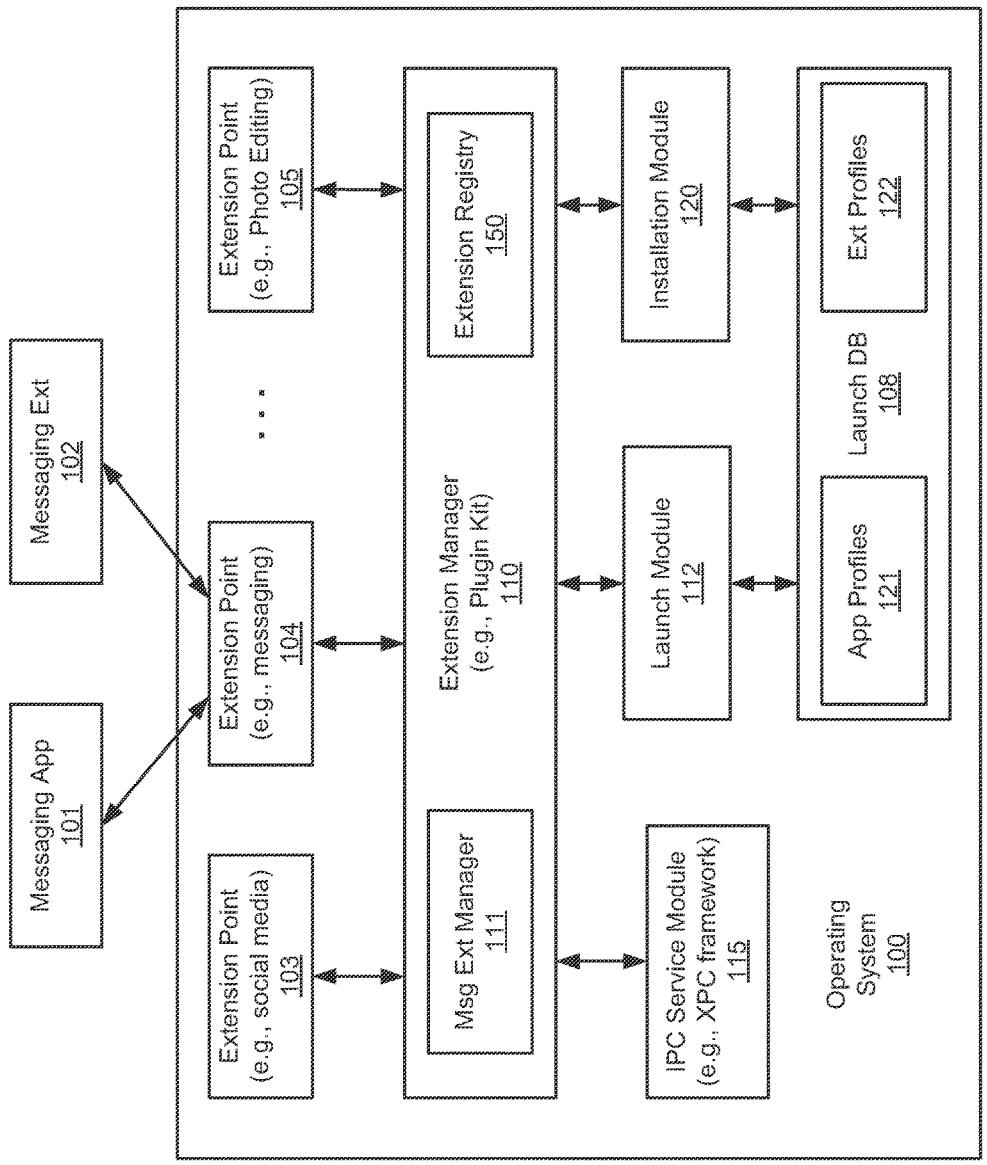
FIG. 1 is a block diagram illustrating an example of architecture of an operating system according to one embodiment of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect of the disclosure, an interface (e.g., inter-process communication or IPC interface) is provided to allow a messaging system or messaging application to invoke a messaging extension (e.g., a plug-in application) to perform a service of categorizing messages. For example, when a messaging system receives a message (e.g., an IM message), the messaging system can send the message without recipient identifying information of the message to a messaging extension through a predefined application programming interface (API). The message being sent to the messaging extension may only include the body or content of the message without any identifying information such as recipient identifying information of the message. Sender identifying information such as a sender identifier (ID) may also be sent to the messaging extension. The messaging extension then performs a content analysis on the message and/or the sender ID to categorize the message. The result of the content analysis is returned to the messaging system via the predefined API. The predefined API is referred to herein as an extension point, such as a messaging extension point to allow a messaging system to communicate with a messaging extension. The messaging extension may be a third party content analysis application that operates as a plug-in with respect to the messaging system. The content analysis result may include information indicating whether the message is a legitimate message that should be delivered to a user, an unwanted message that should be filtered, or unknown.

According to one embodiment, in response to a request received from a messaging system to categorize a message that was received from a remote sender, a messaging extension associated with the messaging system is identified and launched. Recipient identifying information is removed from the message. The body of the message may be optionally scanned to remove or redact any recipient identifying information from the message body such as a phone number, an email address, and/or a name of the recipient. The message without recipient identifying information is transmitted to the messaging extension via a first application programming interface (API). The messaging extension is running within a sandboxed environment within which the message extension is configured to perform a content analysis based on the message and/or the sender ID to categorize the message. A first analysis result is then returned from the messaging extension, wherein the first analysis result includes information indicating whether the message should be delivered to a user or filtered as an unwanted message. A response to the request is generated based on the first analysis result and the response is then transmitted back to the messaging system to allow the messaging system to determine whether the message should be delivered to the user.

According to another embodiment, the first analysis result is examined to determine whether the messaging extension defers the content analysis to be performed at a remote content analysis server. If the first analysis result indicates that the content analysis should be deferred to the remote server, the message without recipient identifying information is transmitted to the remote server via a second API. The remote server is configured to perform the content analysis on the message to determine a category of the message. A second analysis result is received from the remote server. The response to the request to be sent back to the messaging system is generated based on the second analysis result. According to a further embodiment, the second analysis result received from the remote server is forwarded to the messaging extension, where the messaging extension generates a third analysis result as a final analysis result based on the second analysis result. When the third analysis result is received from the messaging extension, the third analysis result is then forwarded to the messaging system. As a result, in this configuration, the messaging system can invoke a third-party content analysis expertise to provide a content analysis application as a messaging extension to the messaging system and the content analysis extension can be updated from time to time without having to modify the messaging system.

According to another aspect of the disclosure, when a messaging system receives a message (e.g., an instant message) from a remote sender, the messaging system examines the message to determine whether the sender is known to a user operating the messaging system as a recipient. The sender is known to the user if a sender ID (e.g., phone number or email address) of the sender can be found in an address book (e.g., contact) of the user. Alternatively, if the user has responded to messages sent by the sender more than a predetermined number of times in a past predetermined period of time, the sender is considered known to the user. The rationale behind this is that if the user has communicated with the sender several times, it is more likely that the user knows the sender. If it is determined that the sender is unknown to the user, the message without recipient identifying information is transmitted to a messaging extension via a predefined API or extension point. The messaging extension may be running within a dedicated sandboxed environment to perform a content analysis on the message. In response to an analysis result received from the messaging extension, the messaging system determines whether the message should be delivered to the user or filtered out based the analysis result.

FIG. 1 is a block diagram illustrating an example of architecture of an operating system according to one embodiment of the disclosure. Operating system 100 may represent any of the operating systems running with data processing systems. For example, operating system 100 may be an iOS™ from Apple®, Android™ from Google®, Windows™ from Microsoft®, or other operating systems (e.g., UNIX, LINUX, real-time or embedded operating systems). A data processing system may be a server, a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof.

Referring to FIG. 1, operating system 100 includes, amongst others, a set of one or more extension points 103-105 to allow various clients, such as messaging application or system 101 and messaging extension 102, to access a set of extensions via extension points 103-105. A client can be an application or an extension. Each of extension points 103-105 represents a set of predefined APIs or protocols to allow one client as a host application to obtain a predefined service or services provided by another client as an extension that extends at least a portion of functionalities of another application as a container application. Each of extension points 103-105 may further define the resources, scheduling, and termination schemes (e.g., which of the process should be terminated first, etc.) for the processes associated with the extension point. In one embodiment, extension points 103-105 may include various commonly used or popular functionalities or services associated with operating system 100. An extension point defines a set of predefined application programming interfaces (APIs) or communications protocols that allow a client to access or to provide a service from and to another client. A service provided by an extension point may be provided by a standard component of the operating system or a third party function provided by a third party vendor.

Extension points 103-105 may be managed by extension manager 110, where extension points 103-105 may be collectively referred to as an extension interface, an extension layer, or an extension framework, as part of system component of operating system 100. For example, when extension 102, as well as its corresponding container application (not shown), is installed, installation module 120 parses metadata of an application bundle containing extension 102 and its container application. Based on the metadata associated with extension 102, installation module 120 recognizes that extension 102 is specifically designed and developed for extension point 104. For example, extension 102 may be developed using a specific extension template and compiled with a specific set of libraries corresponding to extension point 104. Extension 102 may be provided by a third party or a provider of operating system 100.

Installation module 120 then installs extension 102 in operating system 100 and stores any information related to extension 102 in launch database 108. For example, a security profile (e.g., configuration file) of extension 102 may be compiled and stored as a part of extension profiles 122 in launch database 108. Similarly, each application operating as a client to extensions points 103-105 may be associated with an application profile stored as a part of application profiles 121 in launch database (DB) 108. A security profile may include information indicating that extension 102 is capable of providing a particular service or services through extension point 104. The security profile may further include resource entitlements and/or restrictions that may be subsequently utilized to configure a sandboxed environment when extension 102 is launched. Other extensions may be installed in a similar way by installation module 120. In addition, extension 102 may also be registered in extension registry 150, which may be used subsequently for searching extension services in response to a query for a particular type or class of extension services. Note that extension registry 150 and launch database 108 may be integrated into a single repository having a query application programming interface (API).

Subsequently, when a client, in this example, messaging system or application 101, inquires by communicating via extension 104 about a service available for extension point 104 (also referred to as an extension service), in this example, a content analysis service, extension manager 110 invokes launch module 112 (or discovery module, not shown) to discover any extensions installed in the system that are capable of providing the inquired service. In response, launch module 112 searches within launch database 108 to identify and determine which of the installed extensions are capable of providing such a service.

In one embodiment, the inquiry may include information specifying certain specific resources that are required for the service. In response, launch module 112 searches and identifies those who can handle the specified resources. For example, a host application may specify the data size that a service is required to handle. Thus, the extension framework as shown in FIG. 1 is able to match the capabilities of extensions with the specification of the requested services. Alternatively, extension manager 110 may query extension registry 150 to identify a list of extensions that are capable of providing the requested extension service or services, where launch DB 108 contains information for configuring a sandboxed operating environment when launching an extension based on extension profiles 122.

If there is only one extension installed capable of providing services for extension point 104, launch module 112 may automatically launch the identified extension. If there are multiple extensions that are capable of providing services for extension point 104, launch module 112 may present a list of the extensions to allow a user or client 101 to select one of them for launching. Once the selected extension, in this example, messaging extension 102, has been launched, extension manager 110 invokes inter-process communications (IPC) service module 115 to facilitate IPC communications between client 101 and client 102 via extension point 104. In one embodiment, the communications between client 101 and client 102 are asynchronous message-based communications, such as the XPC framework available from Apple Inc. In one embodiment, each of extension points 103-105 includes at least two sets of APIs, one for host applications (e.g., client 101) to invoke extension services and the other for extensions (e.g., client 102) to provide extension services.

In one embodiment, extension points 103-105 include a messaging extension point, in this example, messaging extension point 104, to allow a messaging system or application to invoke a messaging extension to perform a content analysis on a message, such as an instant message, received from a remote sender. The messaging extension point may be managed by messaging extension manager 111. The messaging extension may be provided as a part of operating system 100. Alternatively, the messaging extension may be a third-party content analysis application provided by a third-party vendor. When the messaging system requires a content analysis on a particular message, the message excluding the recipient identifying information is transmitted to the messaging extension for content analysis via the corresponding extension point. Based on the content analysis performed by the messaging extension, the messaging system can determine whether the message should be delivered to an inbox of the user. If it is determined that the message is an unwanted message based on the content analysis performed by the messaging extension, the message may be dropped or stored in a spam folder of the user.

Figure 2:
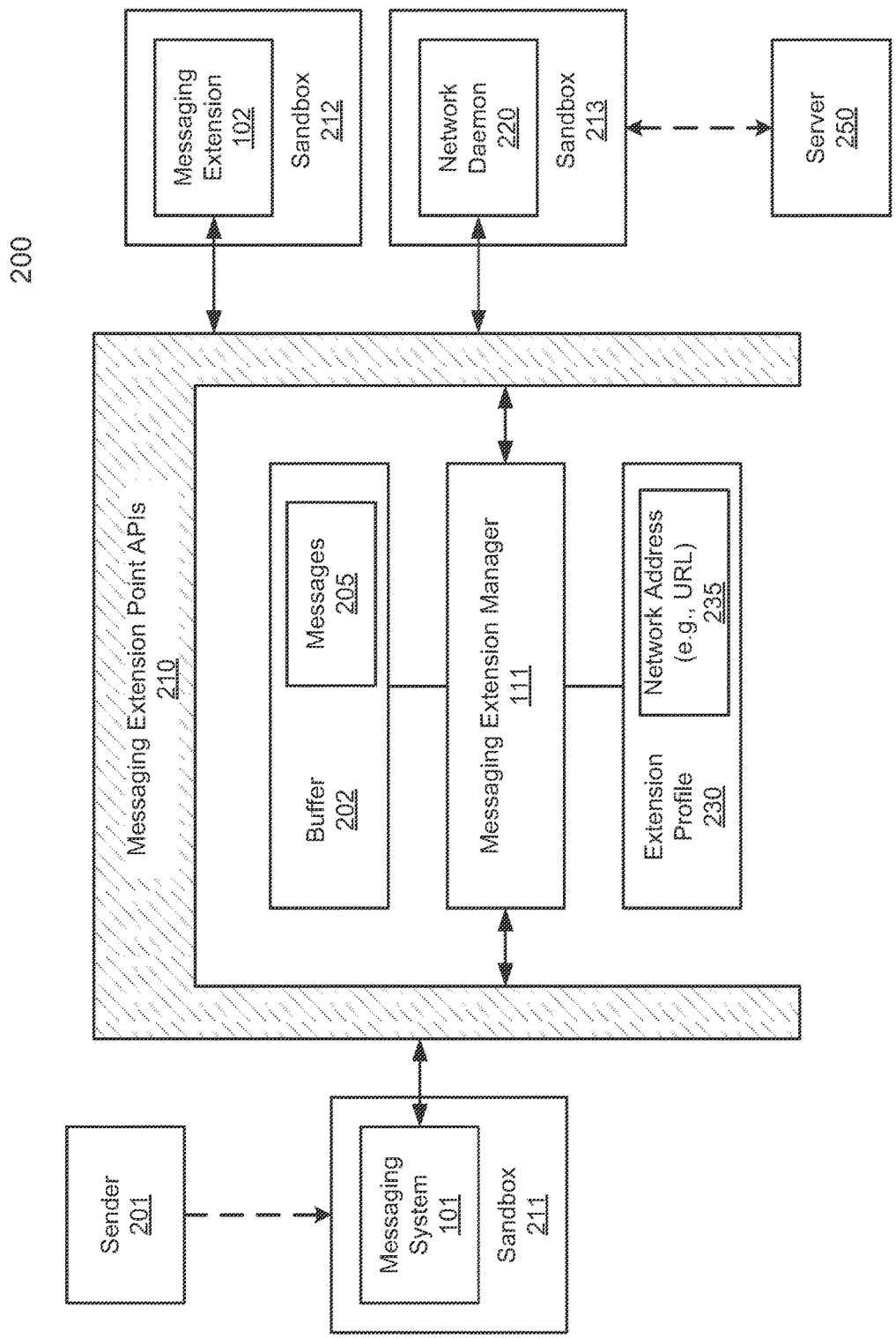
FIG. 2 is a block diagram illustrating an example of a messaging extension point according to one embodiment of the disclosure.

FIG. 2 is a block diagram illustrating an example of a messaging extension point according to one embodiment of the disclosure. Messaging extension point 200 may be implemented as any one of extension points 102-105 of FIG. 1. Referring to FIG. 2, messaging system or application 101 and messaging extension 102 are communicatively coupled to messaging extension manager 111 via messaging extension point APIs 210. In this example, messaging extension manager 111 and messaging extension point APIs 210 logically represent a messaging extension point. In one embodiment, messaging system 101 is executed within sandbox 211 and messaging extension 102 is executed within sandbox 212. Sandboxes 211-212 are separate sandboxes. Messaging system 101 may be provided by a provider of the operating system, while messaging extension 102 may be provided by a third party or the provider of the operating system.

Since messaging system 101 and messaging extension 102 are executed in separate sandboxed environments as sandboxed processes, they normally cannot directly communicate with each other. Rather, messaging system 101, as a host application in this example, communicates using a first set of APIs or protocols associated with extension point 210 to access system resources such as messaging extension manager 111, launch module 112, and IPC service module 115, etc. Similarly, messaging extension 102, as an extension in this example, communicates using a second set of APIs or protocols associated with messaging extension point 210 to access messaging extension manager 111, launch module 112, and IPC service module 115. In order to access messaging extension point 210, messaging system/application 101 and messaging extension 102 may be compiled and linked using a software development kit (SDK) that is associated with extension point 210 during the software development.

A sandboxed process refers to a process that has been restricted within a restricted operating environment (e.g., sandbox) that limits the process to a set of predefined resources. Each sandboxed process may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 100.

To provide security, an application may be "contained" by restricting its functionality to a subset of operations and only allowing operations that are necessary for the proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process or address space and is further prohibited from spawning a non-sandboxed process. For example, a security profile of a sandboxed process may include a rule or policy that denies the sandboxed process from using certain system calls, which may be a mechanism that allows processes to alter each other's address spaces.

Referring back to FIG. 2, when messaging system 101 receives a message from remote sender 201, messaging system 101 determines whether the message needs to be categorized. In one embodiment, if sender 201 is unknown to a user operating the system, messaging system 101 transmits the message to messaging extension manager 111 via a first API of messaging extension point APIs 210. In one embodiment, messaging system 101 may remove any recipient identifying information from the message prior to sending the message to the messaging extension point. Messaging system 101 may optionally scan the message body to identify and remove or redact any recipient identifying information from the message body. Sender 201 is known to the user if a sender ID of sender 201 is listed in an address book or contact of the user. A message can be a short messaging service (SMS) message, a multimedia messaging service (MMS) message, or any other proprietary messages such as an iMessage™ from Apple Inc. A sender ID can be a mobile phone number and/or an email address of sender 201. Alternatively, if the user has prior communications with the sender 201 for a period of time, the sender may be considered known to the user. For example, if the user has responded to messages received from sender 201 for more than a predetermined number of times (e.g., three times) sender 201 is considered known to the user.

Figure 3:
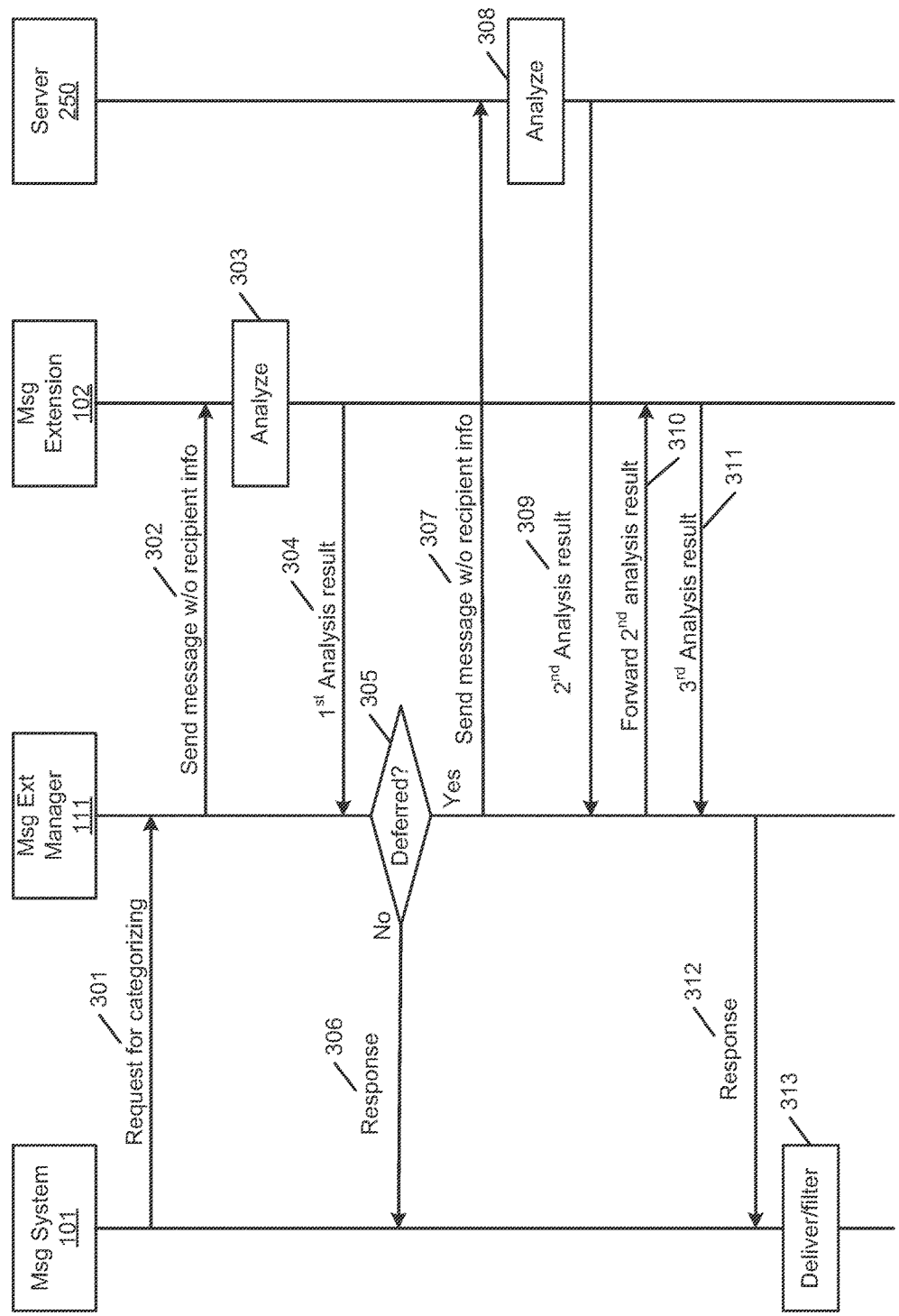
FIG. 3 is a flow processing diagram illustrating a processing flow of categorizing messages according to one embodiment of the disclosure.

Referring now to FIGS. 2 and 3, when messaging extension manager 111 receives the message from messaging system 101 via the first API via path 301, messaging extension manager 111 stores the message as a part of messages 205 in buffer 202. In addition, according to one embodiment, messaging extension manager 111 removes from the message recipient identifying information of a recipient of the message, in this example, any user identifying information of the user. Messaging extension manager 111 may optionally scan the message body to remove or redact any recipient identifying information such as a phone number, an email address, and/or a name of the recipient. In one embodiment, the recipient information may be removed by messaging system 101. The message may be buffered in buffer 202 as part of messages 205. The recipient identifying information may include a phone number and/or an email address of a recipient. Messaging extension manager 111 transmits via a second API the message without recipient identifying information to messaging extension 102 via path 302. In one embodiment, messaging extension manager 111 sends only the body of the message (e.g., content of the message body) and a sender ID of the sender to messaging extension 102.

In response to the message received from messaging extension manager, at block 303, messaging extension 102 performs a content analysis on the message and/or sender ID to categorize the message. Once the content analysis has been performed, messaging extension 102 transmits a first analysis result back to messaging extension manager 111 via path 304. The first analysis result may include information indicating whether the message should be delivered to the user or the message should be filtered out. In one embodiment, the category of a message may be one of 1) allowed, 2) filtered, and 3) deferred. When a message is categorized as "allowed," the message should be delivered to the user. When a message is categorized as "filtered," the message should be filtered out without delivering to the user. When a message is categorized as "deferred," it means that messaging extension 102 is not able to categorize the message. Instead, messaging extension 102 defers the content analysis to a remote server such as remote server 250. For example, messaging extension 102 may not have the latest data pattern definitions or rules to categorize the message. Rather, remote server 250 may have up-to-date data pattern definitions or rules to sufficiently categorize the message.

At block 305, messaging extension manager 111 examines the first analysis result to determine whether the first analysis result indicates that the content analysis should be deferred. If it is determined that the first analysis result contains either an "allowed" category or a "filtered" category, messaging extension manager 111 forwards the first analysis result to messaging system 101 via path 306 and messaging system 101 can determine whether to deliver the message to the user or filter out the message at block 313.

If it is determined that the category of the message determined by messaging extension 102 is "deferred," messaging extension manager 111 transmits the message (without recipient identifying information) to remote content analysis server 250 via path 307 and requests content analysis server 250 to perform the content analysis. In one embodiment, in response to the first analysis result received from messaging extension 102 indicating that the category of the message is "deferred," messaging extension manager 111 retrieves the buffered message from buffer 202. Messaging extension manager 111 transmits the retrieved message to network daemon 220 via a third API. Network daemon 220 is executed within sandbox 213 that is separated from sandboxes 211-212. Network daemon 220 is responsible for establishing a network connection with a remote entity, in this example, content analysis server 250.

In one embodiment, messaging extension manager 111 retrieves a network address associated with server 250 from extension profile 230 that is associated with messaging extension 102. In this example, extension profile 230 contains a universal resource locator (URL) link that has been previously configured during the installation of messaging extension 102. Messaging extension manager 111 transmits the message and the network address to network daemon 220 via the third API to request network daemon 220 to transmit the message to the network address. In response, network daemon 220 transmits message to content analysis server 250 according to the network address received from messaging extension manager 111.

According to one embodiment, all network requests are performed by network daemon 220 and extension 102 is prevented from accessing the network directly via a sandbox profile. In some cases, only HTTPS (secured hypertext transport protocol) URLs are permitted for network requests, and must not require any special application transport security (ATS) configuration settings. A dedicated configuration can be used to ensure network requests do not persist HTTP cookies. Extension 102 may be prevented from writing data to a storage location shared with messaging system 101 via a sandbox profile. After installing a container application containing messaging extension 102, a user may be asked to explicitly opt-in to use it. In some cases, a single extension 102 can be enabled at a time instead of multiple versions of extensions 102 being enabled at a time.

Typically, messaging extension 102 has a relationship with server 250, where server 250 serves as a backend server to messaging extension 102. When messaging extension 102 cannot determine the category of a message, messaging extension 102 may request server 250 for help. Note that since messaging extension 102 is executed in sandbox 212, whatever messaging extension 102 does would be maintained within sandbox 212. For example, messaging extension 102 cannot directly communicate with network daemon 220 or remote server 250. Rather, messaging extension 102 has to go through the messaging extension point, i.e., messaging extension manager 111, in order to reach server 250. Messaging extension manager 111 does not forward any data generated from messaging extension 102 to content analysis server 250. As a result, messaging extension 102 and/or server 250 cannot profile a recipient of the message such as building a social graph about the recipient based on the messages. Even if messaging extension 102 might be able to profile the recipient, it cannot communicate the profiling information outside of the corresponding sandbox 212 to reach server 250.

At block 308, server 250 performs a content analysis on the message and transmits a second analysis result back to messaging extension manager 111 via path 309. The second analysis result may indicate that the category of the message is "allowed" or "filtered." In response to the second analysis result, messaging extension manager 111 may directly forward the second analysis result to messaging system 101 to allow message system 101 to determine whether the message should be delivered to the user at block 313. Alternatively, according to one embodiment, messaging extension manager 111 forwards via the second API the second analysis result to messaging extension 102 via path 310. In response to the second analysis result, messaging extension 102 generates a third analysis result as the final result based on the second analysis result and transmits the third analysis result back to messaging extension manager 111 via path 311. The third analysis result may indicate that the category of the message is "allowed" or "filtered." In response to the third analysis result, messaging extension manager 111 generates a response based on the third analysis result and transmits the response to messaging system 101 via path 312. At block 313, messaging system 101 determines whether the message should be delivered to the user based on the third analysis result.

According to another embodiment, when messaging extension 102 cannot definitely categorize a message or remote server 250 is unavailable, messaging extension 102 categorize the message as "unknown." For example, after deferring the content analysis to remote server 250, due to the network congestion, the network connection with server 250 times out. In this situation, the message may be categorized with an "unknown" category. When messaging system 101 receives a response from the extension point indicating that the message's category is unknown, it is up to messaging system 101 to decide whether the message should be delivered to the user. Alternatively, when messaging system 101 does not hear anything back from the messaging extension point after a timeout period (e.g., 10 seconds), messaging system 101 may deliver the message to the recipient as usual.

Note that a message may include sensitive information such as personal information (e.g., personal contact information) or confidential information (e.g., bank account information, social security number) concerning a sender and/or a recipient. The user as a recipient may not want to send the message to a third party application to determine whether the message is an unwanted message. In one embodiment, a mechanism is in placed to allow a user to opt in or opt out regarding whether a message should be sent to a third-party content analysis application.

The present disclosure recognizes that the use of personal information data (such as sender identifying information collected by the third-party content analysis application), in the present technology, can be used to the benefit of users. For example, the personal information data can be used to determine or train a machine-learning algorithm to determine whether messages from a particular source are more likely unwanted messages. The present disclosure further contemplates that the entities (e.g., third-party content analysis application) responsible for the collection, analysis, disclosure, transfer, storage, or other use of such personal information data will comply with well-established privacy policies and/or privacy practices.

In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of messaging spam filtering, the present technology can be configured to allow users to select to "opt in" or "opt out" of participation sending messages to a third-party content analysis application.

According to one embodiment, before allowing an application or an extension to access a Web site or a server, the application or the extension is examined whether the application or the extension is authorized to access that particular Web site or server. In this example, before messaging extension 102 is allowed to access, indirectly via messaging extension point API 210, server 250, its extension profile 230 is examined to determine whether messaging extension 102 is entitled to access server 250 using a website-to-application association mechanism. The authorization process can be performed during the installation of messaging extension 102 or at real-time in response to a request to defer the content analysis to server 250.

In one embodiment, in order to enable messaging extension 102 to access server 250, extension profile 230 has to be configured to include an entitlement of a domain associated with server 250. When messaging extension 102 is installed, installer 120 scans extension profile 230 to identify the entitlement and access a predefined URL of server 250 to download and verify a signature of a website-to-application association file from server 250. If the verification is successful, messaging extension 102 is associated with the domain of server 250 and messaging extension 102 can "access" server 250. This prevents random software developers from using other developers' web servers without permission (e.g. developer B attempts to use the same URL as developer A without first gaining developer A's permission). In this example, messaging extension 102 is prevented from deferring content analysis to a web server that is not authorized, associated, or not entitled to. Further detailed information concerning the techniques of website-to-application association mechanism can be found in U.S. patent application Ser. No. 14/732,612, filed Jun. 5, 2015, which is incorporated by reference herein in its entirety.

Figure 4:
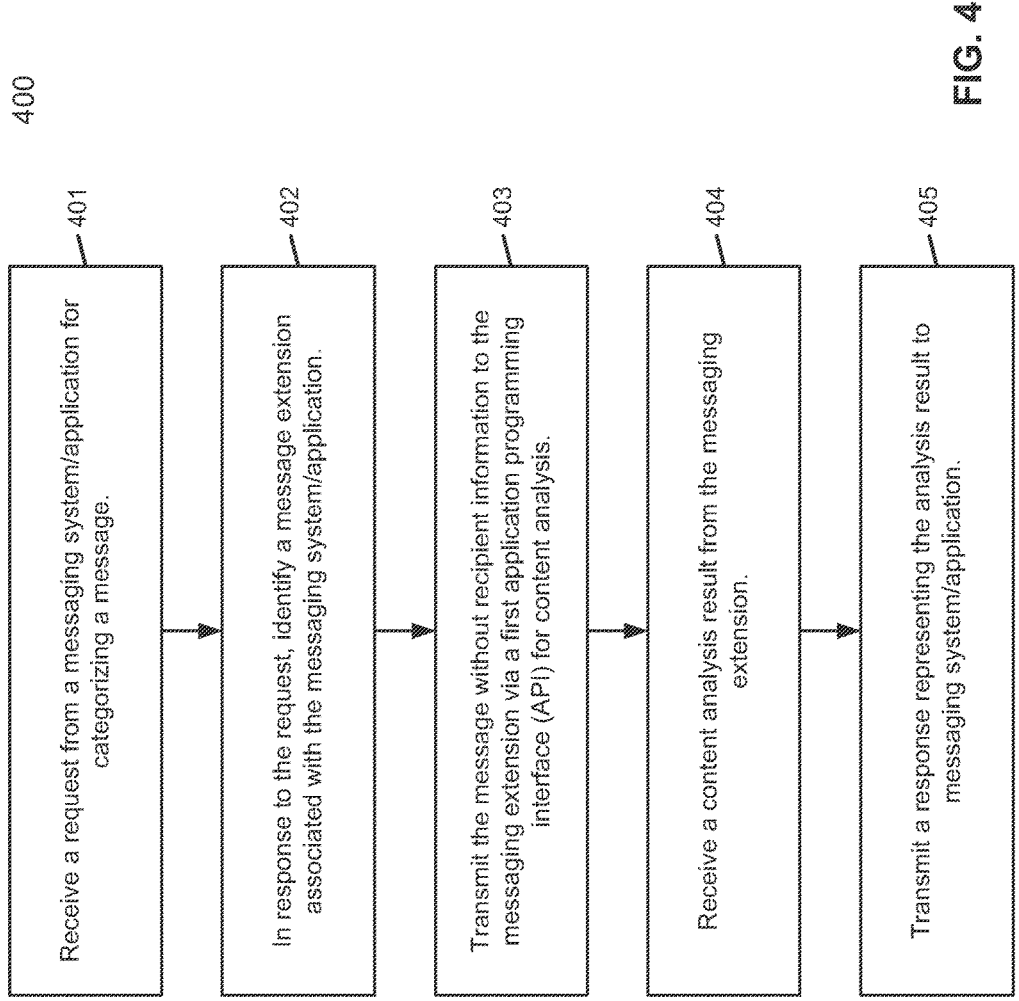
FIG. 4 is a flow diagram illustrating a process of categorizing messages according to one embodiment of the disclosure.

FIG. 4 is a flow diagram illustrating a process of categorizing messages according to one embodiment of the disclosure. Process 400 may be performed by processing logic that includes hardware (e.g. circuitry, dedicated logic, etc.), software (e.g., embodied on a non-transitory computer readable medium), or a combination thereof. For example, process 400 may be performed by messaging extension manager 111 of FIG. 2. Referring to FIG. 4, in operation 401, processing logic receives a request from a messaging system to categorize a message that was received from a sender. In response to the request, in operation 402, processing logic identifies a messaging extension (e.g., a third-party content analysis application) that is associated with the messaging system. In operation 403, processing logic transmits the message without recipient identifying information of a recipient of the message to the messaging extension via a first API. The messaging extension is to perform a content analysis on the message to determine a category of the message. A category of the message can be "allowed" or "filtered." In operation 404, an analysis result is received from the messaging extension. A response to the request is then created based on the analysis result and in operation 405, the response is transmitted to the messaging system to allow the messaging system to determine whether the message should be delivered to the intended recipient. If the message has been categorized as "allowed," the message may be delivered to an inbox of the messaging system. If the message has been categorized as "filtered," the message may be delivered to a spam or an unknown sender folder of the messaging system or not shown.

Figure 5:
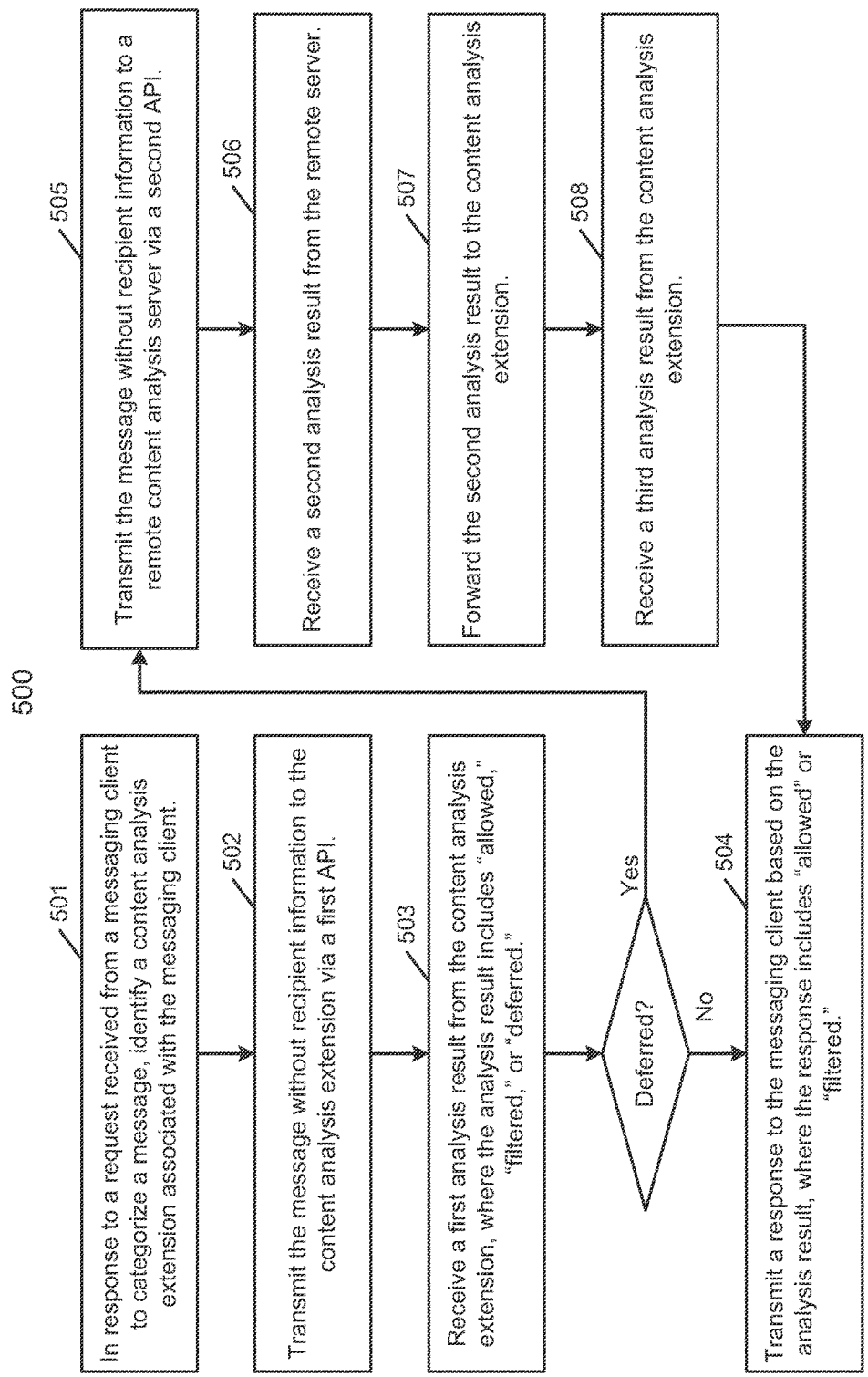
FIG. 5 is a flow diagram illustrating a process of categorizing messages according to another embodiment of the disclosure.

FIG. 5 is a flow diagram illustrating a process of categorizing messages according to another embodiment of the disclosure. Process 500 may be performed by processing logic that includes hardware (e.g. circuitry, dedicated logic, etc.), software (e.g., embodied on a non-transitory computer readable medium), or a combination thereof. For example, process 500 may be performed by messaging extension manager 111 of FIG. 2. Referring to FIG. 5, in response to a request received from a messaging client to categorize a message, in operation 501, processing logic identifies a content analysis extension (e.g., messaging extension) associated with the messaging client. In operation 502, processing logic transmits the message (without recipient information identifying a recipient of the message) to the content analysis extension to allow the content analysis extension to perform a content analysis on the message. In operation 503, processing logic receives a first analysis result from the content analysis extension, the first analysis result including one of "allowed," "filtered," or "deferred" category. If the category of the message is not a deferred category, in operation 504, processing logic generates a response to the request based on the category of the message and transmits the response to the messaging client to allow the messaging client to determine whether the message should be delivered to the intended recipient.

If it is determined that the category in the first analysis result is "deferred," in operation 505, processing logic transmits the message without recipient information to a remote server via a second API. The remote server is to perform a content analysis on the message. In operation 506, processing logic receives a second analysis result from the remote server. The second analysis result may indicate whether the message has been categorized as "allowed" or "filtered." Based on the second analysis result, processing logic can generate a response to the request and transmit the response to the messaging client. The response may simply indicates the category of the message as one of "allowed" or "filtered." Alternatively, in operation 507, processing logic forwards the second analysis result to the content analysis extension. The content analysis extension can generate a third analysis result as the final analysis result based on the second analysis result. In operation 508, processing logic then receives the third analysis result from the content analysis extension. In operation 504, processing logic generates a response based on the third analysis result and transmits the response to content analysis extension.

Figure 6:
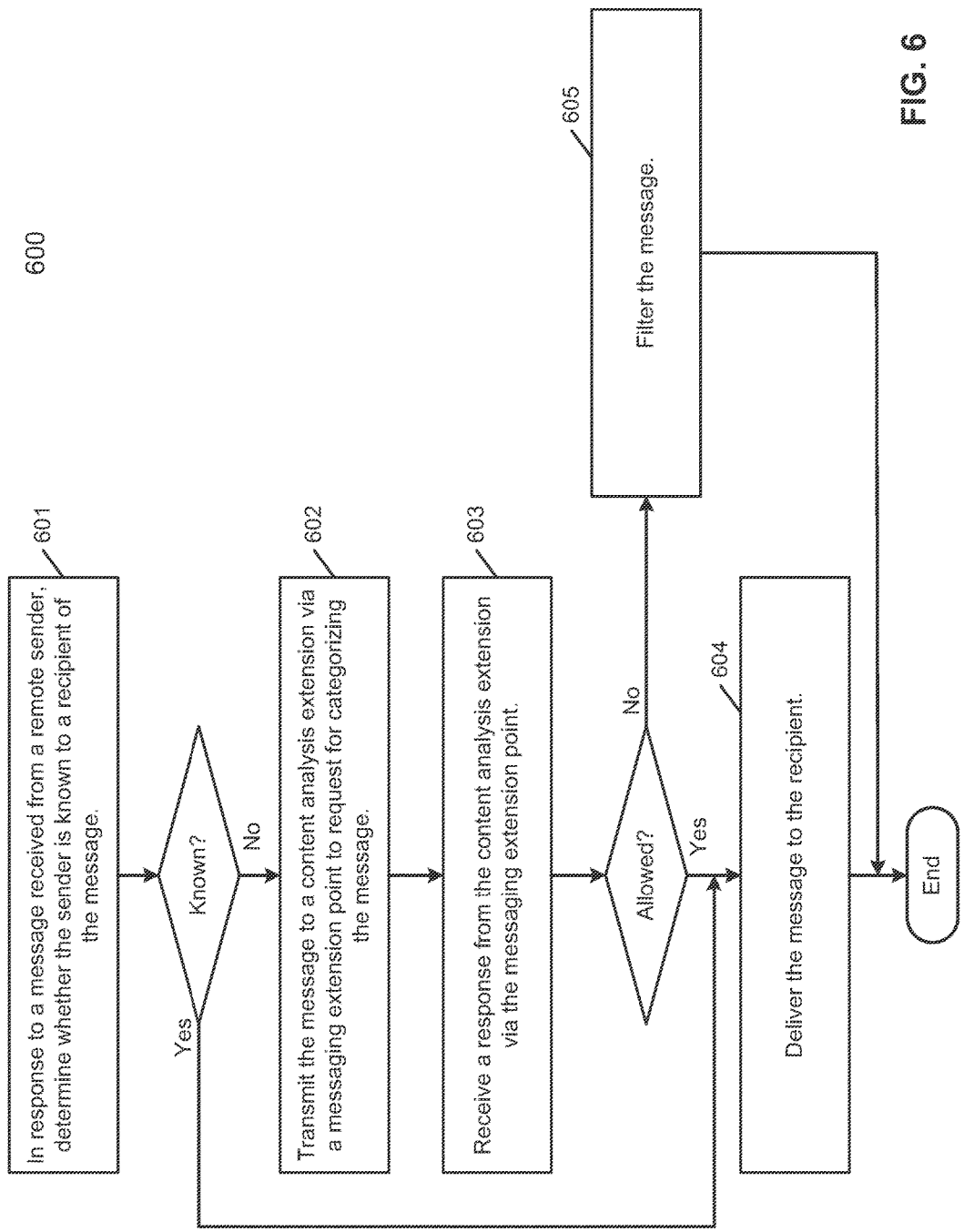
FIG. 6 is flow diagram illustrating a process of categorizing messages according to another embodiment of the invention.

FIG. 6 is flow diagram illustrating a process of categorizing messages according to another embodiment of the invention. Process 600 may be performed by messaging system 101. Referring to FIG. 6, in response to a message received from a remote sender, in operation 601, processing logic determines whether the sender is a known sender. A sender is known to a user as a recipient if a sender ID (e.g., phone number, email address) of the sender is found in an address book or contact of the recipient. Alternatively, a sender is known to the user if the user has responded to messages sent by the sender in the past more than a predetermined number of times. If the sender is known to the user as a recipient, in operation 604, the message is then delivered to the user.

If it is determined that the sender is unknown to the user, in operation 602, processing logic transmits the message to a content analysis extension via a predetermined extension point to request for categorizing the message. In operation 603, processing logic receives a response from the content analysis extension via the extension point. If the response indicates the message is allowed to be delivered to the user, in operation 604, the message is then delivered to the user. Otherwise, in operation 605, the message is filtered out.

The above communications framework has been described for the purpose of categorizing messages. In one embodiment, the above communications framework can also be utilized to provide a feedback to the messaging extension or the remote server. For example, messaging system may provide a user interface to allow a user to specify certain sender or message is not a spam sender or spam message, even if it was categorized by the content analysis system as a spam sender or spam message. The user can send a request to the system requesting that a certain sender to be taken off from the spam sender list, etc.

Figure 7:
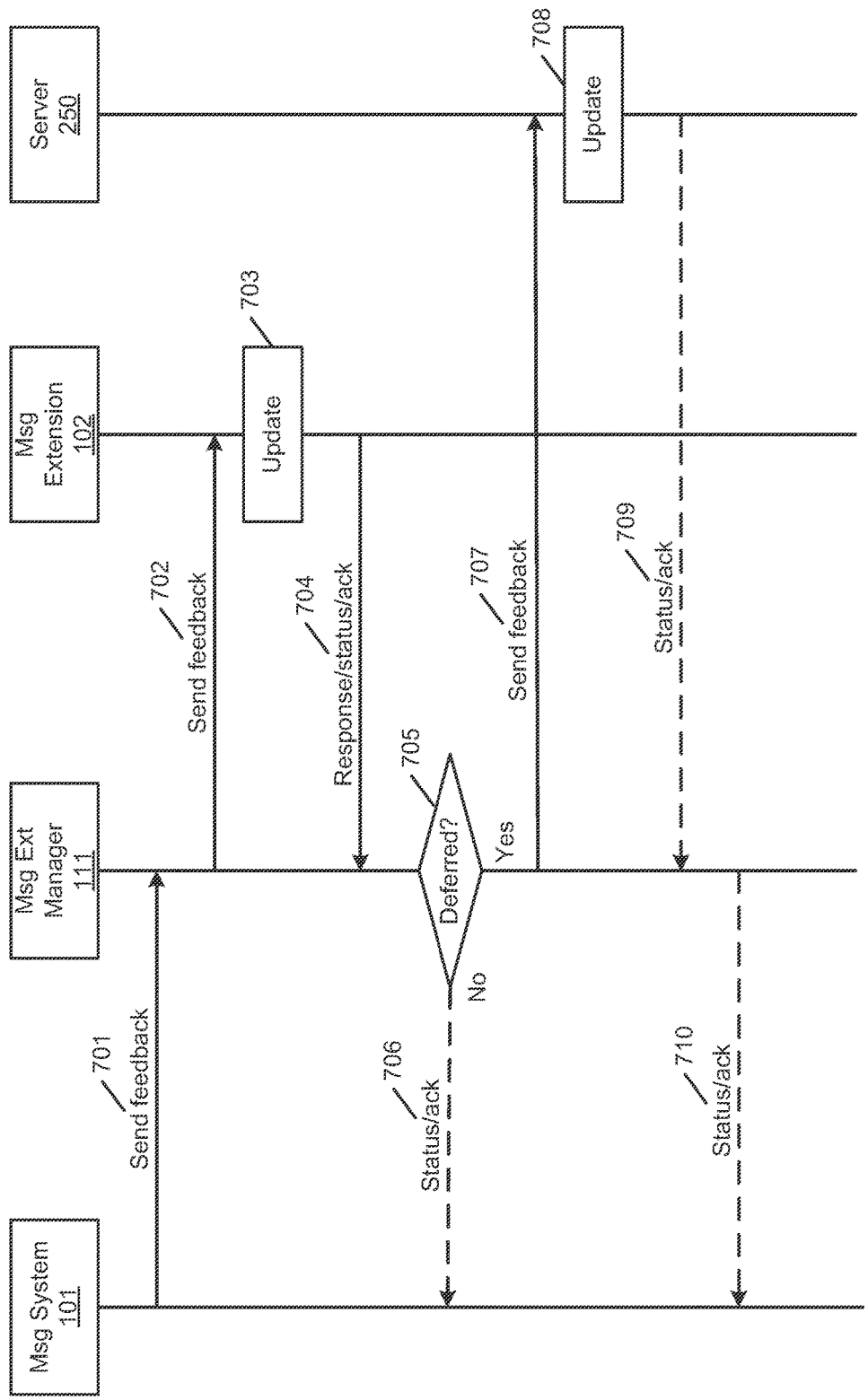
FIG. 7 is a processing flow diagram illustrating a process of providing feedback of content analysis on messages according to one embodiment.

FIG. 7 is a processing flow diagram illustrating a process of providing feedback of content analysis on messages according to one embodiment. Referring to FIG. 7, messaging system 101 sends a feedback to messaging extension manager 111 via path 701. The feedback can be an indication of whether a particular message or sender is not a spam message or sender. A GUI may be implemented to receive the feedback from a recipient to whitelist or blacklist certain messages and/or senders. The feedback may be utilized to train and adjust the content analysis algorithms. In response, messaging extension manager 111 sends the feedback to messaging extension 102 via path 702. At block 703, messaging extension 102 updates its internal data structure or algorithm based on the feedback. Messaging extension manager 111 receives a response from messaging extension 102 via path 704. If the response indicates that the feedback should be deferred to remote server 250 at block 705, the feedback is then transmitted to remote server 250 via path 707. In this configuration, messaging extension 102 can send the feedback to server 250, for example, anonymously. Otherwise, messaging extension manager 111 may optionally send a status or acknowledgement back to messaging system 101 via path 706. In response to the feedback, at block 708, server 250 updates its internal data structure or algorithm based on the feedback. Server 250 may optionally sends a status/acknowledgement back to messaging extension manager 111 via path 709 and messaging extension manager 111 may optionally forward the same back to messaging system 101 via path 710.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
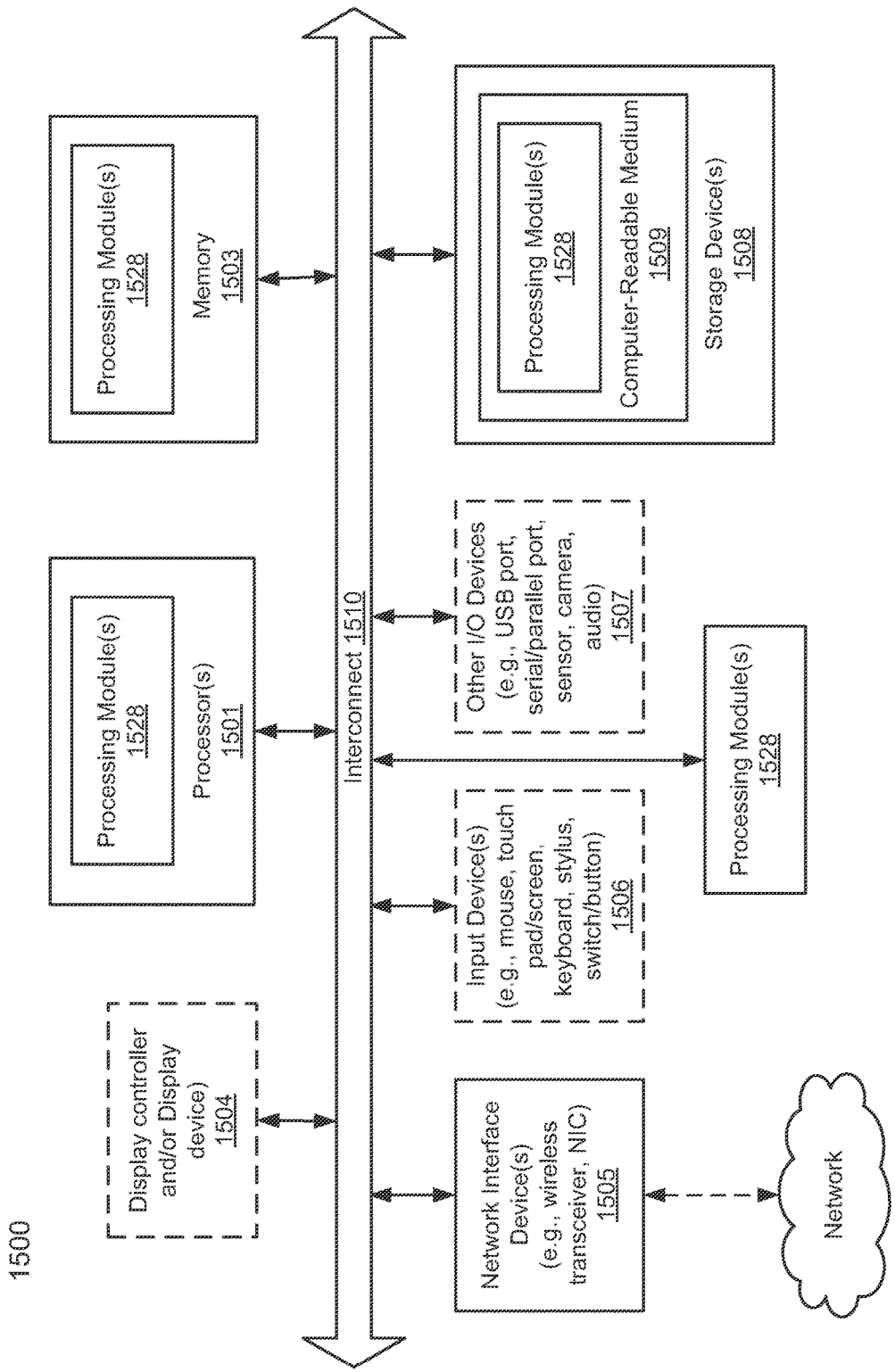
FIG. 8 is a block diagram illustrating a data processing system according to one embodiment.

FIG. 8 is a block diagram illustrating an example of a data processing system which may be used with one embodiment of the disclosure. For example, system 1500 may represents any of data processing systems described above performing any of the processes or methods described above, such as system 100 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, messaging extension manager 111. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

It is apparent for those skilled in the art that, for the particular operation processes of the units/modules described above, reference may be made to the corresponding operations in the related method embodiment sharing the same or similar concept and the reference is regarded as the disclosure of the related units/modules also. And therefore some of the particular operation processes will not be described repeatedly or in detail for convenience and concision of description.

It is also apparent for those skilled in the art that the units/modules can be implemented in an electronic device in the manner of software, hardware and/or combination of software and hardware. Units described as separate components may or may not be physically separated. In particular, units according to each embodiment of the present disclosure may be integrated in one physical component or may exist in various separate physical components. The various implementations of units in the electronic device are all included within the scope of protection of the disclosure.

It should be understood that the unit, apparatus, and device described above may be implemented in form of software, hardware known or developed in the future and/or the combination of such software and hardware. It is apparent for persons in the art that the operations or functional blocks described above may be implemented in form of software, hardware and/or the combination of such software and hardware, depending on the particular application environment. At least some of the operations or functional blocks described above can be implemented by running instructions in general processor, with the instructions stored in storage. At least some of the operations or functional blocks described above can also be implemented by various hardware, including but not limited to DSP, FPGA, ASIC etc. For example, the components, modules, units, and/or functional blocks described above may be implemented by instructions running in CPU or by special processor such as DSP, FPGA, ASIC implementing the functionality of the components, modules, units, and/or functional blocks.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for categorizing messages, the method comprising:
in response to a request received from a messaging system to categorize a message received from a remote sender, identify a messaging extension associated with a messaging client;
transmitting the message without a recipient identifier (ID) identifying a recipient of the message to the messaging extension via a first application programming interface (API), wherein the messaging extension is executed within a first sandboxed environment, and wherein the messaging extension is to perform a content analysis on the message to categorize the message; and in response to a first analysis result received from the messaging extension, transmitting a response representing the first analysis result to the messaging system, wherein the response indicates whether the message should be delivered or filtered.

2. The method of claim 1, further comprising:
examining the first analysis result to determine whether the messaging extension defers the content analysis to a remote server;
in response to determining that the content analysis should be deferred, transmitting the message without the recipient ID to the remote server via a second API, wherein the remote server is to perform the content analysis; and
in response to receiving a second analysis result from the remote server, generating the response to be transmitted to the messaging system based on the second analysis result.

3. The method of claim 2, further comprising:
in response to the second analysis result, forwarding the second analysis result to the messaging extension via the first API;
receiving a third analysis result from the messaging extension, wherein the third analysis result was generated by the messaging extension based on the second analysis result; and
generating the response to be transmitted to the messaging system based on the third analysis result.

4. The method of claim 1, wherein the messaging system is executed within a second sandboxed environment that is different from the first sandboxed environment.

5. The method of claim 2, wherein transmitting the message without the recipient ID to the remote server comprises transmitting the message without the recipient ID to a network daemon executed in a third sandboxed environment via a third API, wherein the network daemon is to transmit the message without the recipient ID to the remote server.

6. The method of claim 1, wherein the message is received from the messaging system when the sender is unknown to a user associated with the messaging system.

7. The method of claim 6, wherein the sender is unknown to the user when a sender ID identifying the sender cannot be found in an address book of the user.

8. The method of claim 6, wherein the sender is unknown to the user when the user has responded to messages received from the sender less than a predetermined number of times.

9. The method of claim 1, wherein the recipient ID represents at least one of a phone number of the recipient, an email address of the recipient, and a name of the recipient.

10. A non-transitory machine-readable medium having instructions stored therein, which when executed by at least one processor, cause the at least one processor to perform operations for categorizing messages, the operations comprising:
in response to a request received from a messaging system to categorize a message received from a remote sender, identify a messaging extension associated with a messaging client;
transmitting the message without a recipient identifier (ID) identifying a recipient of the message to the messaging extension via a first application programming interface (API), wherein the messaging extension is executed within a first sandboxed environment, and wherein the messaging extension is to perform a content analysis on the message to categorize the message; and in response to a first analysis result received from the messaging extension, transmitting a response representing the first analysis result to the messaging system, wherein the response indicates whether the message should be delivered or filtered.

11. The machine-readable medium of claim 10, wherein the operations further comprise:

examining the first analysis result to determine whether the messaging extension defers the content analysis to a remote server;

in response to determining that the content analysis should be deferred, transmitting the message without the recipient ID to the remote server via a second API, wherein the remote server is to perform the content analysis; and in response to receiving a second analysis result from the remote server, generating the response to be transmitted to the messaging system based on the second analysis result.

12. The machine-readable medium of claim 11, wherein the operations further comprise:

in response to the second analysis result, forwarding the second analysis result to the messaging extension via the first API;

receiving a third analysis result from the messaging extension, wherein the third analysis result was generated by the messaging extension based on the second analysis result; and generating the response to be transmitted to the messaging system based on the third analysis result.

13. The machine-readable medium of claim 10, wherein the messaging system is executed within a second sandboxed environment that is different from the first sandboxed environment.

14. The machine-readable medium of claim 11, wherein transmitting the message without the recipient ID to the remote server comprises transmitting the message without the recipient ID to a network daemon executed in a third sandboxed environment via a third API, wherein the network daemon is to transmit the message without the recipient ID to the remote server.

15. The machine-readable medium of claim 10, wherein the message is received from the messaging system when the sender is unknown to a user associated with the messaging system.

16. The machine-readable medium of claim 15, wherein the sender is unknown to the user when a sender ID identifying the sender cannot be found in an address book of the user.

17. The machine-readable medium of claim 15, wherein the sender is unknown to the user when the user has responded to messages received from the sender less than a predetermined number of times.

18. The machine-readable medium of claim 10, wherein the recipient ID represents at least one of a phone number of the recipient, an email address of the recipient, and a name of the recipient.

19. A data processing system, comprising:
at least one processor; and
at least one memory storing instructions, which when executed by the at least one processor, cause the at least one processor to perform operations, the operations including in response to a request received from a messaging system to categorize a message received from a remote sender, identify a messaging extension associated with a messaging client, transmitting the message without a recipient identifier (ID) identifying a recipient of the message to the messaging extension via a first application programming interface (API), wherein the messaging extension is executed within a first sandboxed environment, and wherein the messaging extension is to perform a content analysis on the message to categorize the message, and in response to a first analysis result received from the messaging extension, transmitting a response representing the first analysis result to the messaging system, wherein the response indicates whether the message should be delivered or filtered.

20. The system of claim 19, wherein the operations further comprise:

examining the first analysis result to determine whether the messaging extension defers the content analysis to a remote server;

in response to determining that the content analysis should be deferred, transmitting the message without the recipient ID to the remote server via a second API, wherein the remote server is to perform the content analysis; and in response to receiving a second analysis result from the remote server, generating the response to be transmitted to the messaging system based on the second analysis result.

21. The system of claim 20, wherein the operations further comprise:

in response to the second analysis result, forwarding the second analysis result to the messaging extension via the first API;

receiving a third analysis result from the messaging extension, wherein the third analysis result was generated by the messaging extension based on the second analysis result; and generating the response to be transmitted to the messaging system based on the third analysis result.

22. A computer-implemented method for categorizing messages, the method comprising:

in response to a messaging received at a messaging system from a remote sender over a network, determining whether the remote sender is known to a user operating the messaging system;

in response to determining that the remote sender is unknown to the user, transmitting the message without a recipient identifier (ID) identifying the user to a third-party messaging extension via a first application programming interface (API), wherein the third-party messaging extension is executed within a first sandboxed environment, and wherein the third-party messaging extension is to perform a content analysis on the message to categorize the message; and in response to an analysis result received from the third-party messaging extension, processing the message based on the analysis result.

23. The method of claim 22, wherein determining whether the remote sender is known to a user operating the messaging system comprising determining whether a sender ID of the remote sender is found in an address book of the user.

24. The method of claim 23, wherein determining whether the remote sender is known to a user operating the messaging system comprising determining whether the user has responded to messages received from the sender more than a predetermined number of times.

25. The method of claim 22, wherein processing the message based on the analysis result comprises:
   delivering the message to an inbox of the user if the analysis result indicates that the message is allowed for delivery; and
   storing the message in a spam folder if the analysis result indicates that the message should be filtered.

* * * * *